United States Patent
Cheng et al.

(10) Patent No.: US 8,267,366 B2
(45) Date of Patent: Sep. 18, 2012

(54) DISPLAY SUSPENDING FRAME DEVICE

(75) Inventors: Sheng-Hsiung Cheng, Hsichih (TW);
Chih-Hsiung Chen, Hsichih (TW);
Shuang-Ji Jiang, Hsichih (TW)

(73) Assignee: Aopen Inc., Hsichih (TW)

( * ) Notice: Subject to any disclaimer, the term of this patent is extended or adjusted under 35 U.S.C. 154(b) by 265 days.

(21) Appl. No.: 12/755,504

(22) Filed: Apr. 7, 2010

(65) Prior Publication Data
US 2010/0258696 A1    Oct. 14, 2010

(30) Foreign Application Priority Data

Apr. 8, 2009 (TW) .............................. 98111665 A

(51) Int. Cl.
*A47F 1/10* (2006.01)
(52) U.S. Cl. .............. 248/297.31; 248/121; 248/295.11; 361/829
(58) Field of Classification Search .................. 248/121, 248/466, 475.1, 476, 477, 201, 224.8, 225.11, 248/297.31, 917, 919, 295.11, 327; 361/829
See application file for complete search history.

(56) References Cited

U.S. PATENT DOCUMENTS

| | | | | |
|---|---|---|---|---|
| 7,316,379 | B1 * | 1/2008 | Graham | 248/298.1 |
| 7,712,717 | B2 * | 5/2010 | Burns | 248/291.1 |
| 7,963,489 | B2 * | 6/2011 | O'Keene et al. | 248/201 |
| 8,025,264 | B2 * | 9/2011 | Cheng et al. | 248/222.13 |
| 8,154,885 | B2 * | 4/2012 | Anderson | 361/825 |
| 2010/0033943 | A1 * | 2/2010 | Tsai et al. | 361/829 |
| 2010/0123052 | A1 * | 5/2010 | Cheng et al. | 248/121 |

FOREIGN PATENT DOCUMENTS
KR    10 2008 0019489    3/2008

OTHER PUBLICATIONS

CN Appln. No. 200910130972.1—Sep. 26, 2011 Office Action with English translation of Examiner's comments.

* cited by examiner

*Primary Examiner* — Terrell McKinnon
*Assistant Examiner* — Monica Millner
(74) *Attorney, Agent, or Firm* — Davidson Berquist Jackson & Gowdey, LLP

(57) ABSTRACT

A display suspending frame device includes a securing frame, and a first suspending frame and a second suspending frame for mounting respectively to first and second displays to permit suspension of the first and second displays on the securing frame one above the other. The second suspending frame is disposed below the first suspending frame and is capable of upward and downward adjustment by virtue of the configuration thereof or through a fine-tuning unit. Thus, the second display is adjustable in height position to abut against a bottom side of the first display so as to eliminate any clearance between the first and second displays.

12 Claims, 10 Drawing Sheets

DISPLAY SUSPENDING FRAME DEVICE

CROSS-REFERENCE TO RELATED APPLICATION

This application claims priority of Taiwanese Application No. 098111665, filed on Apr. 8, 2009.

BACKGROUND OF THE INVENTION

1. Field of the Invention

The invention relates to a suspending frame device, more particularly to a display suspending frame device for suspending a display.

2. Description of the Related Art

Taiwanese Utility Model No. M338516 discloses a fixed type wall-mounted hanging frame for a display, which allows a display to be suspended. The hanging frame includes a securing base and two support frames. The two support frames can be locked to a rear face of the display and can be suspended from the securing base such that the display can be suspended or mounted vertically through the hanging frame.

Conventionally, the aforementioned hanging frame can be used for mounting a plurality of displays to form a video wall by enlarging the securing base and increasing the number of the support frames. However, due to the size of the securing base, and since the positions of the support frames cannot be adjusted upwardly or downwardly relative to the securing base when the support frames are mounted on the securing base, when a plurality of displays are suspended on the hanging frame, a clearance is often present between two adjacent ones of the displays that are mounted one above the other so that the displays cannot be interconnected seamlessly, thereby affecting the display quality of the video wall.

SUMMARY OF THE INVENTION

Therefore, an object of the present invention is to provide a display suspending frame device capable of permitting fine-tuning of the position of a display mounted thereon.

Another object of the present invention is to provide a display suspending frame device that permits mounting of a plurality of displays one above another thereon. The suspending frame device has fine-tuning functionality to eliminate any clearance between two adjacent displays.

Accordingly, the display suspending frame device of the present invention is for mounting of a first display and a second display one above the other thereon. The display suspending frame device comprises a securing frame, a first suspending frame, and a second suspending frame. The securing frame includes a first support portion and a second support portion disposed below the first support portion. The first suspending frame is for mounting to a rear face of the first display to permit the first display to be suspended on the first support portion of the securing frame by means of the first suspending frame. The second suspending frame includes a second suspending frame body and a second suspending portion disposed on the second suspending frame body. The second suspending frame body is for mounting to a rear face of the second display. The second suspending portion is substantially inverted L-shaped, and cooperates with the second suspending frame body to define a suspending groove that opens downwardly. The second support portion extends partially into the suspending groove when the second display is suspended on the second support portion by means of the second suspending portion and is disposed below the first display.

The fine-tuning functionality of the display suspending frame device of the present invention is realized by the arrangement of a fine-tuning unit on the second suspending frame. The fine-tuning unit permits adjustment of the height position of the second suspending portion relative to the second support portion, and is disposed between the second suspending portion and the second support portion. The fine-tuning unit abuts against the second support portion when the fine-tuning unit moves the second suspending portion upwardly relative to the second support portion.

According to another aspect, the display suspending frame device of the present invention is for mounting of a first display and a second display one above the other thereon. The display suspending frame device comprises a securing frame, a first suspending frame, and a second suspending frame. The securing frame includes a first support portion and a second support portion disposed below the first support portion. The first suspending frame is for mounting to a rear face of the first display to permit the first display to be suspended on the first support portion of the securing frame by means of the first suspending frame. The fine-tuning functionality of the display suspending frame device of the present invention is realized by configuring some of the components of the second suspending frame to be adjustably displaceable. The second suspending frame includes a suspending frame body for mounting to a rear face of the second display, and a suspending member disposed to be suspended on the second support portion. The suspending member has a substantially inverted L-shaped structure and is positioned adjustably on the suspending frame body at different height positions.

According to yet another aspect, the display suspending frame device of the present invention comprises a suspending frame and a securing frame. The suspending frame including a suspending frame body and a suspending portion disposed on the suspending frame body. The suspending port ion is substantially inverted L-shaped, and cooperates with the suspending frame body to define a suspending groove that opens downwardly. The suspending frame body is for mounting to a rear face of a display. The securing frame includes a support portion for suspending the suspending portion. The support portion extends partially into the suspending groove of the suspending frame when the display is suspended on the securing frame by means of the suspending frame.

The fine-tuning functionality of the display suspending frame device of the present invention is realized by the arrangement of a fine-tuning unit on the suspending frame. The fine-tuning unit includes a fine-tuning member. The fine-tuning member is disposed between the suspending portion and the support portion. The fine-tuning member is adjustable to abut against the support portion and move the display upwardly relative to the securing frame.

According to still another aspect, the display suspending frame device of the present invention comprises a securing frame, and a suspending frame for mounting to a display and suspended on the securing frame. The fine-tuning functionality of the display suspending frame device of the present invention is realized by configuring some of the components of the suspending frame to be adjustably displaceable. The suspending frame includes a suspending frame body for mounting to a rear face of a display, and a suspending member suspended on the securing frame. The suspending member has a substantially inverted L-shaped structure and is adjustable to be positioned on the suspending frame body at different heights.

In one embodiment, the present invention is characterized in that the fine-tuning unit is realized through a threaded structure that generates upward and downward displacement when rotated.

In another embodiment, the present invention is characterized in that the fine-tuning unit is realized through an eccentrically pivoted cylindrical structure. A distance between the second suspending portion and the second support portion is adjusted by rotating the cylindrical structure.

In yet another embodiment, the present invention is characterized in that the fine-tuning unit is realized through the arrangement of pads of different thicknesses.

The advantageous effect of the present invention is that the height position of the display on the securing frame can be adjusted by using the fine-tuning unit to adjust the height of the suspending frame or by means of the suspending member that can be adjustably disposed on the suspending frame body at different heights. Thus, if a plurality of displays are mounted one above the other using the display suspending frame device of the present invention, any clearances between adjacent displays can be eliminated.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
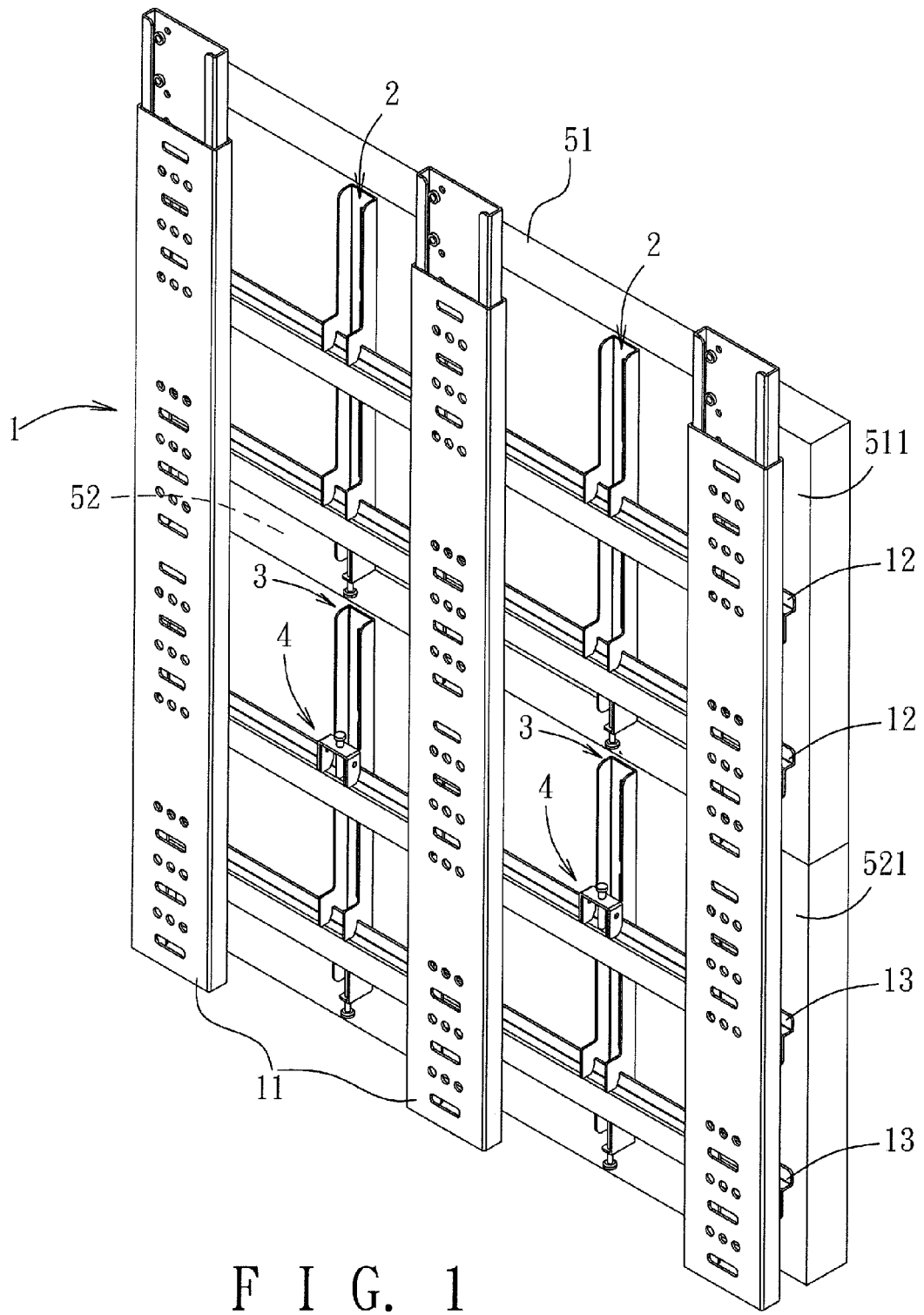
FIG. 1 is a perspective view of the first embodiment of a display suspending frame device according to the present invention.

Before the present invention is described in greater detail, it should be noted that like elements are denoted by the same reference numerals throughout the disclosure.

Referring to FIG. 1, the first embodiment of a display suspending frame device according to the present invention includes a securing frame 1, a pair of first suspending frames 2, a pair of second suspending frames 3, and two fine-tuning units 4 disposed respectively on the two second suspending frames 3. The two first suspending frames 2 are disposed to be mounted to a rear face 511 of a first display 51 (see FIG. 2) to enable the first display 51 to be suspended on the securing frame 1 by means of the two first suspending frames 2. The two second suspending frames 3 are disposed to be mounted to a rear face 521 of a second display 52 (see FIG. 3) to enable the second display 52 to be suspended on the securing frame 1 by means of the two second suspending frames 3 and to be disposed below the first display 51. The first and second displays 51, 52 are exemplified as thin type displays in this embodiment but are not limited thereto in practice.

Figure 2:
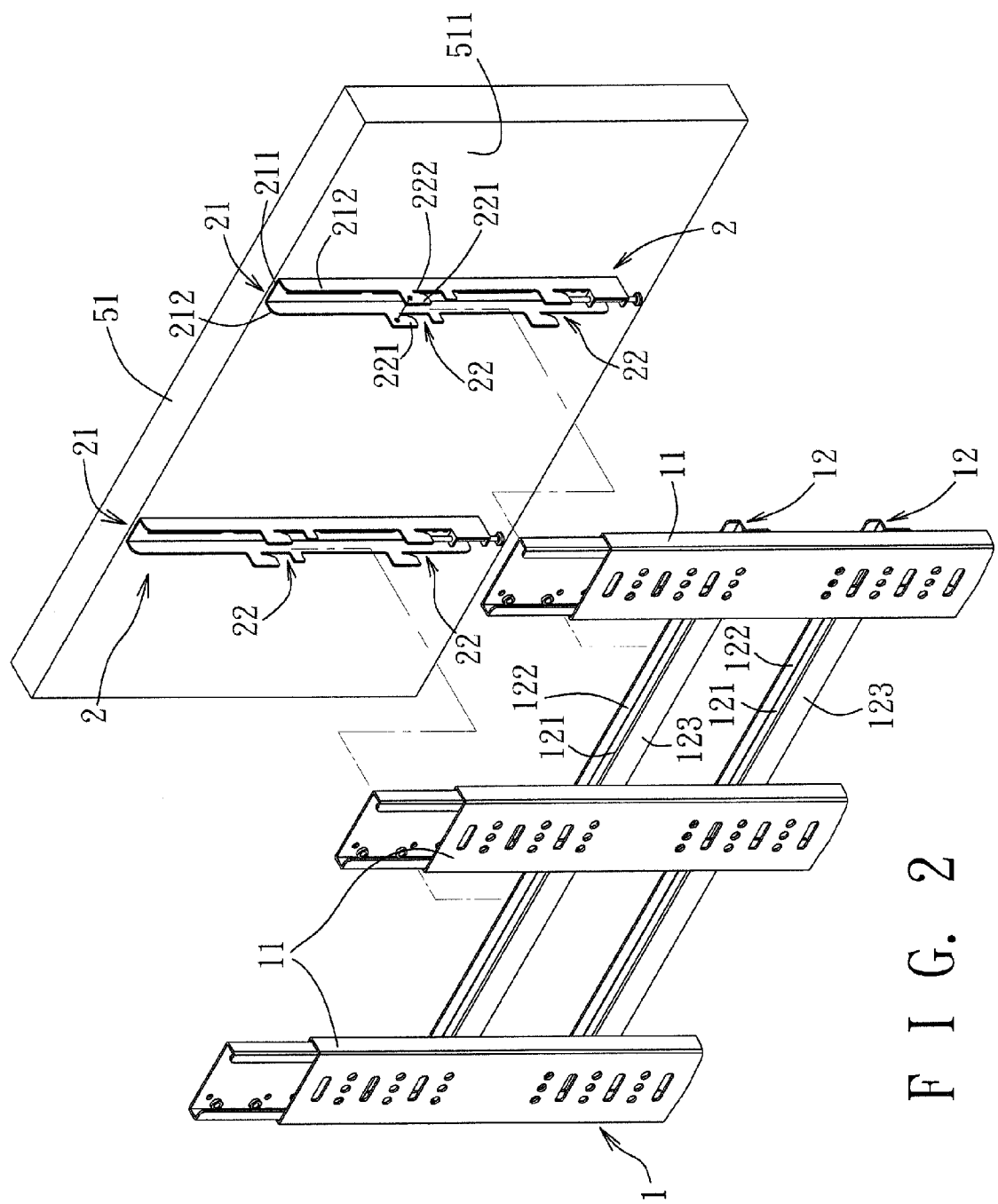
FIG. 2 is a fragmentary exploded perspective view of the first embodiment, showing an upper half portion of a securing frame and a pair of first suspending frames.
Figure 3:
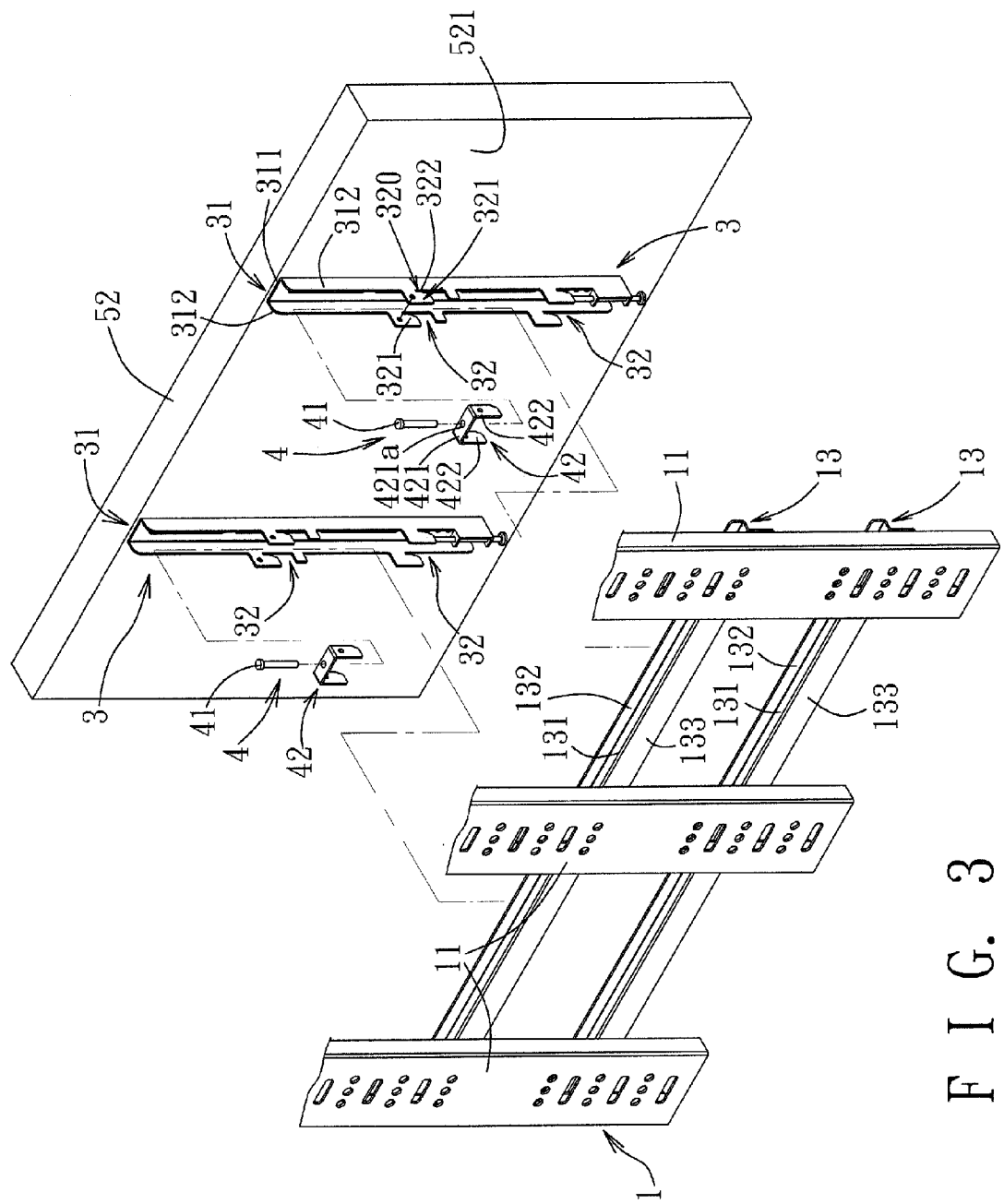
FIG. 3 is a fragmentary exploded perspective view of the first embodiment, showing a lower half portion of the securing frame and a pair of second suspending frames.

Referring to FIGS. 1 to 3, the securing frame 1 includes a plurality of upright support bars 11 that are spaced apart from each other, and two first support portions 12 and two second support portions 13 disposed on the upright support bars 11. It is noted that FIG. 2 depicts merely an upper half portion of the securing frame 1 with the two first support portions 12 mounted thereto, and FIG. 3 depicts merely a lower half portion of the securing frame 1 with the two second support portions 13 mounted thereto. In this embodiment, the first support port ions 12 and the second support portions 13 are horizontal bar structures. The two first support portions 12 are spaced apart one above the other. Each of the first support portions 12 has a top plate 121, a first upright plate 122 extending upwardly from the top plate 121, and a second upright plate 123 extending downwardly from the top plate 121. The two second support portions 13 are located below the two first support portions 12, and are likewise spaced apart one above the other. Each of the second support portions 13 has a top plate 131, a first upright plate 132 extending upwardly from the top plate 131, and a second upright plate 133 extending downwardly from the top plate 131.

Referring to FIG. 2, each of the first suspending frames 2 has a first suspending frame body 21 that is in the form of an upright elongated strip, and two first suspending portions 22 that are disposed on the first suspending frame body 21 and that are spaced apart one above the other. The first suspending frame body 21 includes a front plate 211 and two spaced-apart side plates 212 extending rearwardly and respectively from left and right sides of the front plate 211. Each of the first suspending portions 22 includes two inverted L-shaped hooks 221. The two hooks 221 are respectively connected to rear edges of the two side plates 212 of the respective first suspending frame body 21. Each of the hooks 221 cooperates with the rear edge of a respective one of the side plates 212 of the respective first suspending frame body 21 to define a gap 222. The two first suspending frames 2 are locked to the rear face 511 of the first display 51 in a spaced-apart relationship by means of the front plates 211 thereof, with the first suspending portions 22 thereof oriented rearwardly.

Figure 4:
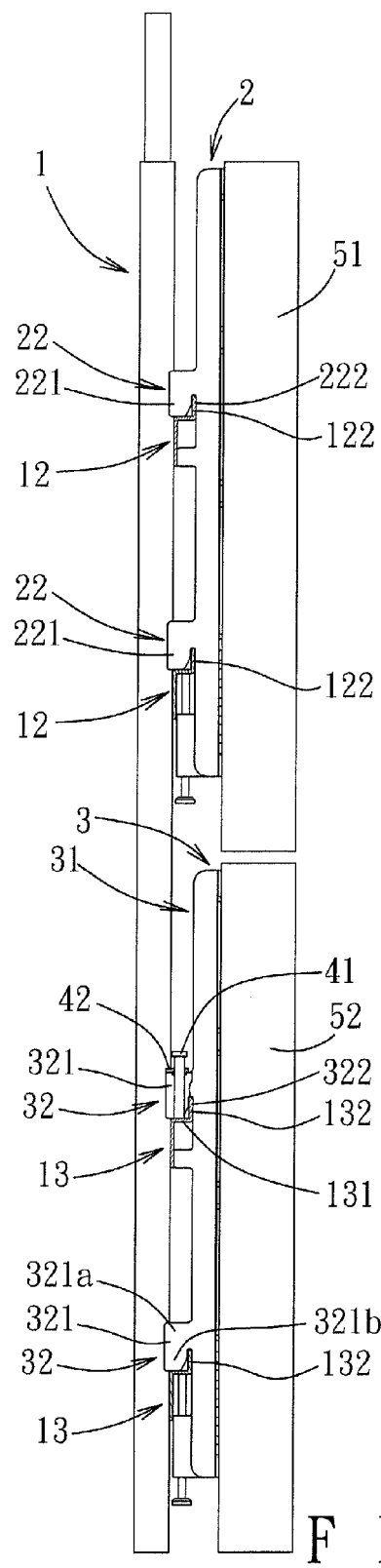
FIG. 4 is a side view of the first embodiment of the display suspending frame device with first and second displays suspended thereon, showing a clearance between the first and second displays.
Figure 5:
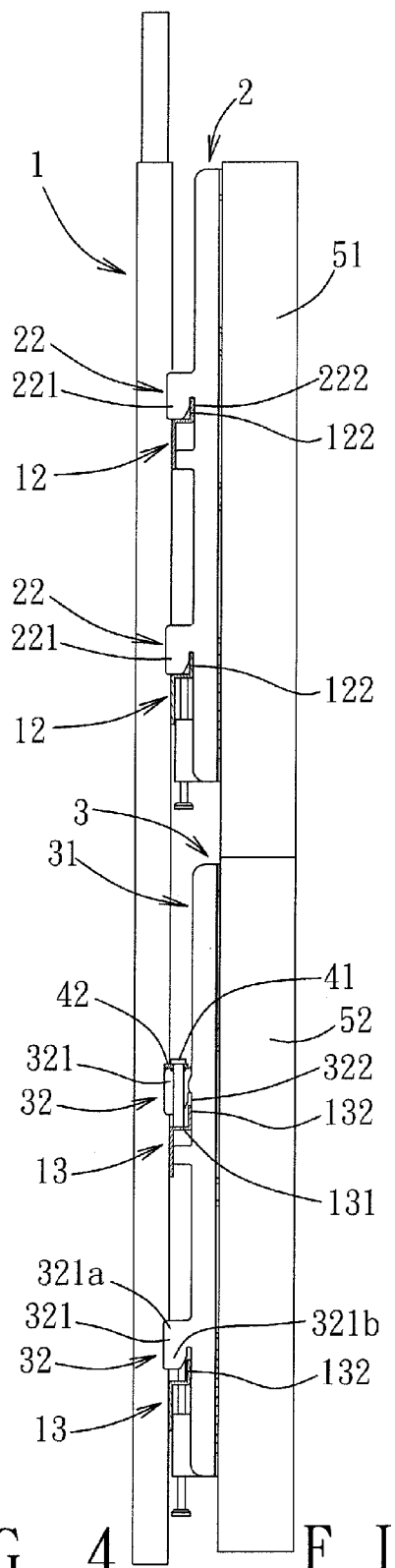
FIG. 5 is a side view similar to FIG. 4, but showing the second display abutting against a bottom side of the first display after adjustment.

Referring to FIG. 3, each of the second suspending frames 3 has a second suspending frame body 31 that is in the form of an upright elongated strip, and two second suspending portions 32 that are disposed on the second suspending frame body 31 and that are spaced apart one above the other. The second suspending portions 32 of each of the second suspending frames 3 are substantially inverted L-shaped structures. Each of the second suspending portions 32 cooperates with the respective second suspending frame body 31 to define a suspending groove 320 that opens downwardly. The second suspending frame body 31 includes a front plate 311 and two side plates 312 extending rearwardly and respectively from left and right sides of the front plate 311. Each of the second suspending portions 32 includes two inverted L-shaped hooks 321. The two hooks 321 are respectively connected to rear edges of the two side plates 312 of the respective second suspending frame body 31. As best shown in FIGS. 4 and 5, each of the hooks 321 includes a first extension segment (321a) extending rearwardly from the respective second suspending frame body 31, and a second extension segment (321b) extending downwardly from the first extension segment (321a) and spaced apart from the respective second suspending frame body 31. Each of the hooks 321 cooperates with the respective second suspending frame body 31 to define a gap 322 that opens downwardly. Each suspending groove 320 includes the gaps 322 cooperatively defined by the two hooks 321 of a respective one of the second suspending portions 32 and the respective second suspending frame body 31. The two second suspending frames 3 are locked to the rear face 521 of the second display 52 by means of the front plates 311 thereof, with the second suspending portions 32 oriented rearwardly.

Referring to FIGS. 3, 4 and 5, in this embodiment, the two fine-tuning units 4 are respectively disposed on upper ones of the second suspending portions 32 of the two second suspending frames 3. Each of the fine-tuning units 4 includes a fine-tuning member 41 and a locking plate 42. The fine-tuning member 41 is a screw bolt. The locking plate 42 has a substantially inverted U-shaped structure as a whole, and has a locking plate portion 421 and two spaced-apart positioning plate portions 422 extending downwardly from the locking plate portion 421. The locking plate portion 421 is provided with a locking hole (421a). The locking plate 42 is disposed on the respective second suspending portion 32 by means of the two positioning plate portions 422 that are respectively secured to the two hooks 321 of the respective second suspending portion 32 (e.g., through threaded fasteners, rivet fasteners, solder connection, etc.) such that the locking plate portion 421 is interposed between the two hooks 321 of the respective second suspending portion 32. The fine-tuning member 41 extends through the locking hole (421a) in the locking plate portion 421 with a distal end thereof oriented downwardly.

Referring to FIGS. 1 and 4, when the first display 51 is suspended on the securing frame 1 by means of the first suspending frames 2, the two first suspending portions 22 of each of the first suspending frames 2 are respectively suspended on the two first support portions 12. The hooks 221 of each of the first suspending portions 22 are suspended on the first upright plate 122 of the respective first support portion 12, i.e., the first upright plate 122 of the respective first support portion 12 extends into the two corresponding gaps 222. Similarly, when the second display 52 is suspended on the securing frame 1 by means of the second suspending frames 3, the two second suspending portions of each of the second suspending frames 3 are respectively suspended on the two second support portions 13. The hooks 321 of each of the second suspending portions 32 are suspended on the first upright plate 132 of the respective second support portion 13, i.e., the first upright plate 132 of the respective second support portion 13 extends into the two corresponding gaps 322. At this time, the distal end of the fine-tuning member 41 of each of the fine-tuning units 4 is oriented downwardly toward the top plate 131 of the upper one of the second support portions 13.

Referring to FIGS. 4 and 5, it is noted that, when the second display 52 is suspended on the securing frame 1 and is located below the first display 51, there may be a clearance between the first and second displays 51, 52 due to dimensional designs of the first support portions 12 and the second support portions 13. In this case, by rotating the fine-tuning members 41 downwardly to cause the distal ends thereof to abut against the top plate 131 of the upper one of the second support portions 13, due to the threaded engagement between the fine-tuning member 41 and the locking plate 42 of each of the fine-tuning units 4, the second suspending frames 3 can be displaced upwardly relative to the second support portions 13 to thereby move the second display 52 upwardly to abut against a bottom side of the first display 51. Thus, the clearance between the first and second displays 51, 52 can be eliminated. Hence, when the first and second displays 51, 52 are assembled to form a video wall for displaying a relatively large image, the integrity of the image will not be adversely affected by the presence of a clearance between the first and second displays 51, 52.

It is additionally noted that, in this embodiment, although the fine-tuning units 4 are provided on the upper ones of the second suspending portions 32 of the second suspending frames 3, in practice, each of the second suspending portions 32 of the second suspending frames 3 may be provided with one fine-tuning unit 4.

Figure 6:
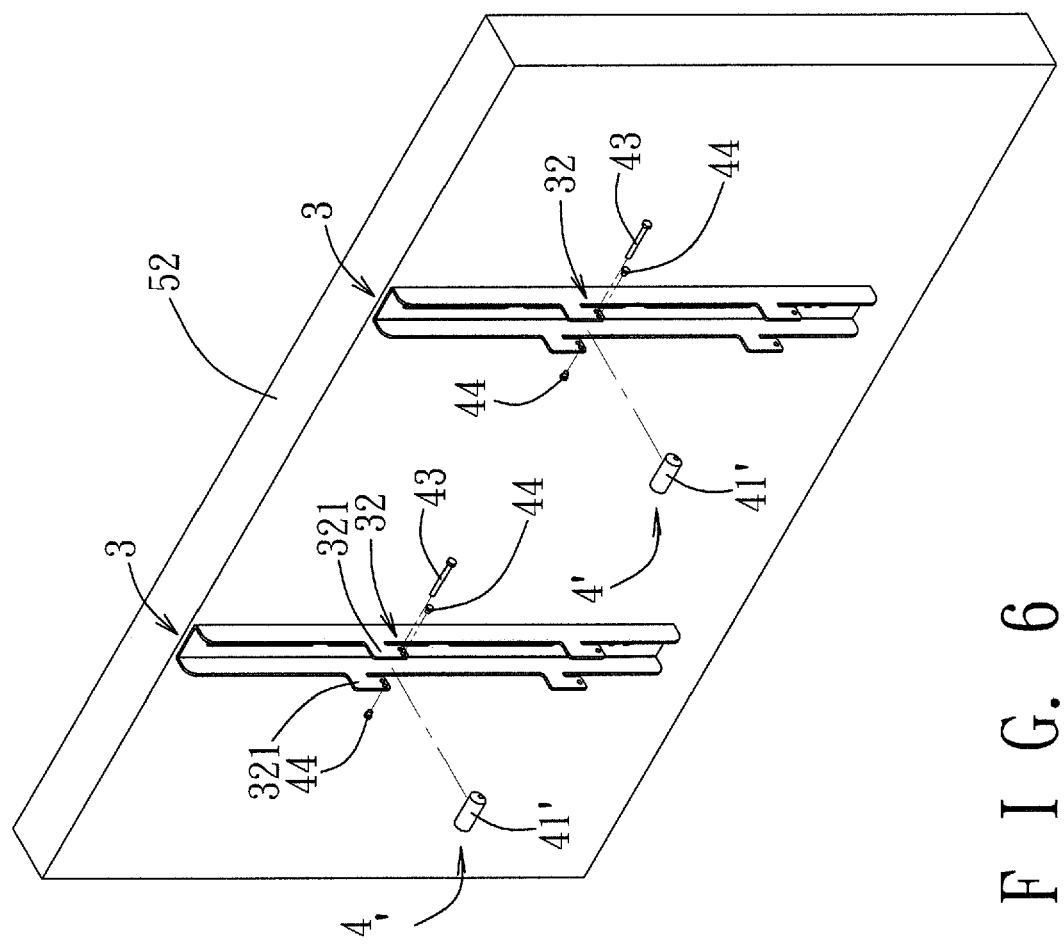
FIG. 6 is a fragmentary exploded perspective view of the second embodiment of a display suspending frame device according to the present invention, showing a fine-tuning unit and a second suspending frame.
Figure 7:
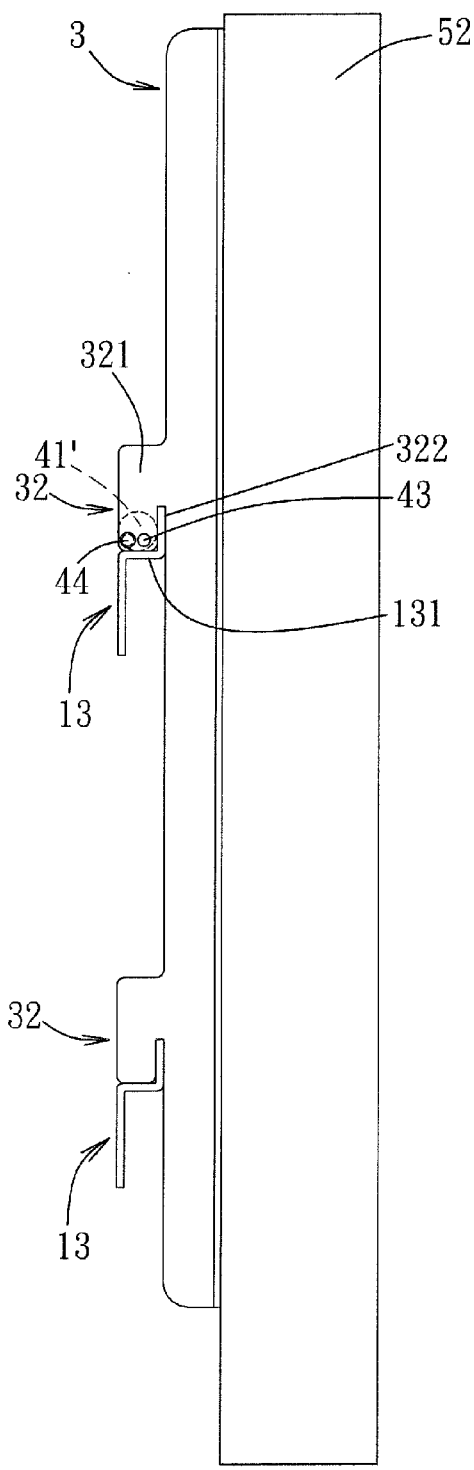
FIG. 7 is a side view of the second embodiment, showing a second display suspended on the second suspending frame.
Figure 8:
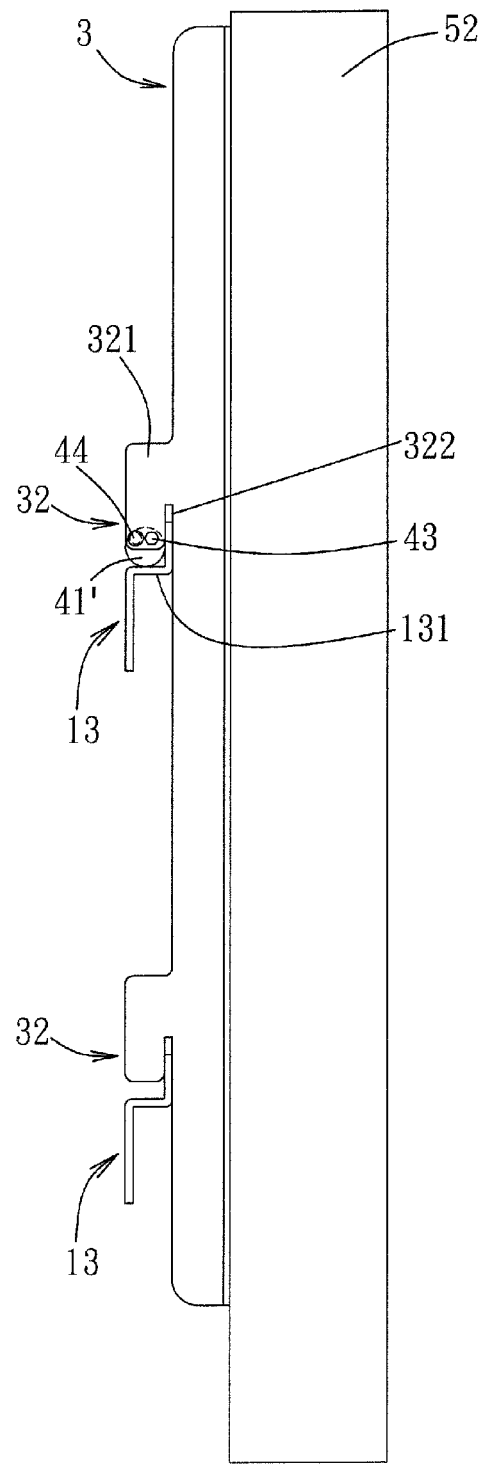
FIG. 8 is a side view similar to FIG. 7, but showing a part of the fine-tuning unit extending outwardly of a hook after being rotated so that the second display is moved upwardly.

Referring to FIGS. 6 to 8, the second embodiment of this invention differs from the first embodiment mainly in the structure of the fine-tuning unit 4' thereof. It is initially noted that the securing frame 1 and the first suspending frames 2 are omitted in FIGS. 6 to 8, and only the second suspending frames 3, the fine-tuning units 4' to be disposed on the second suspending frames 3, and the second display 52 are depicted therein.

In the second embodiment, each of the fine-tuning units 4' includes a fine-tuning member 41', a pivot axle 43, and two positioning members 44. The fine-tuning member 41' has a cylindrical shape, is pivoted transversely and eccentrically between the two hooks 321 of the upper one of the second suspending portions 32 of the respective second suspending frame 3 by means of the pivot axle 43, and is disposed adjacent to distal ends of the two hooks 321. Since the fine-tuning member 41' is pivoted eccentrically, when the fine-tuning member 41' is rotated relative to the two hooks 321 to a certain angle, a part of the fine-tuning member 41' will project downwardly of the two hooks 321.

Therefore, when it is needed to shift the second display 52 upwardly so as to eliminate a clearance between the first and second displays 51, 52 in a situation similar to that depicted in FIG. 4, each fine-tuning member 41' can be rotated to cause a part thereof to project downwardly of the corresponding hooks 321 and to abut against the top plate 131 of the upper one of the second support portions 13, thereby moving the second suspending frames 3 together with the second display 52 upwardly. Thus, the object of adjusting the position of the second display 52 to eliminate the clearance can be achieved.

It is further noted that, in this embodiment, the positioning members 44 are screws which are respectively disposed on the two hooks 321 of the upper one of the second suspending portions 32 of the corresponding second suspending frame 3 provided with the fine-tuning member 41'. The function of the positioning members 44 is that, when each of the fine-tuning members 41' is rotated such that a part thereof projects downwardly of the two corresponding hooks 321 and abuts against the top plate 131 of the corresponding second support portion 13, by means of the two positioning members 44 that extend respectively through the two hooks 321 of the upper one of the second suspending portions 32 of the corresponding second suspending frame 3 and that respectively abut against two axial ends of the respective fine-tuning member 41', each fine-tuning member 41' can be held tightly by the two positioning members 44 and retained at an angular position. In an alternative embodiment, each of the fine-tuning units 4' includes only one positioning member 44, which is disposed to extend through only one of the hooks 321 of the corresponding second suspending portion 32.

Similarly, in the second embodiment, each of the two second suspending portions 32 of each of the second suspending frames 3 maybe provided with a fine-tuning unit 4'.

Figure 9:
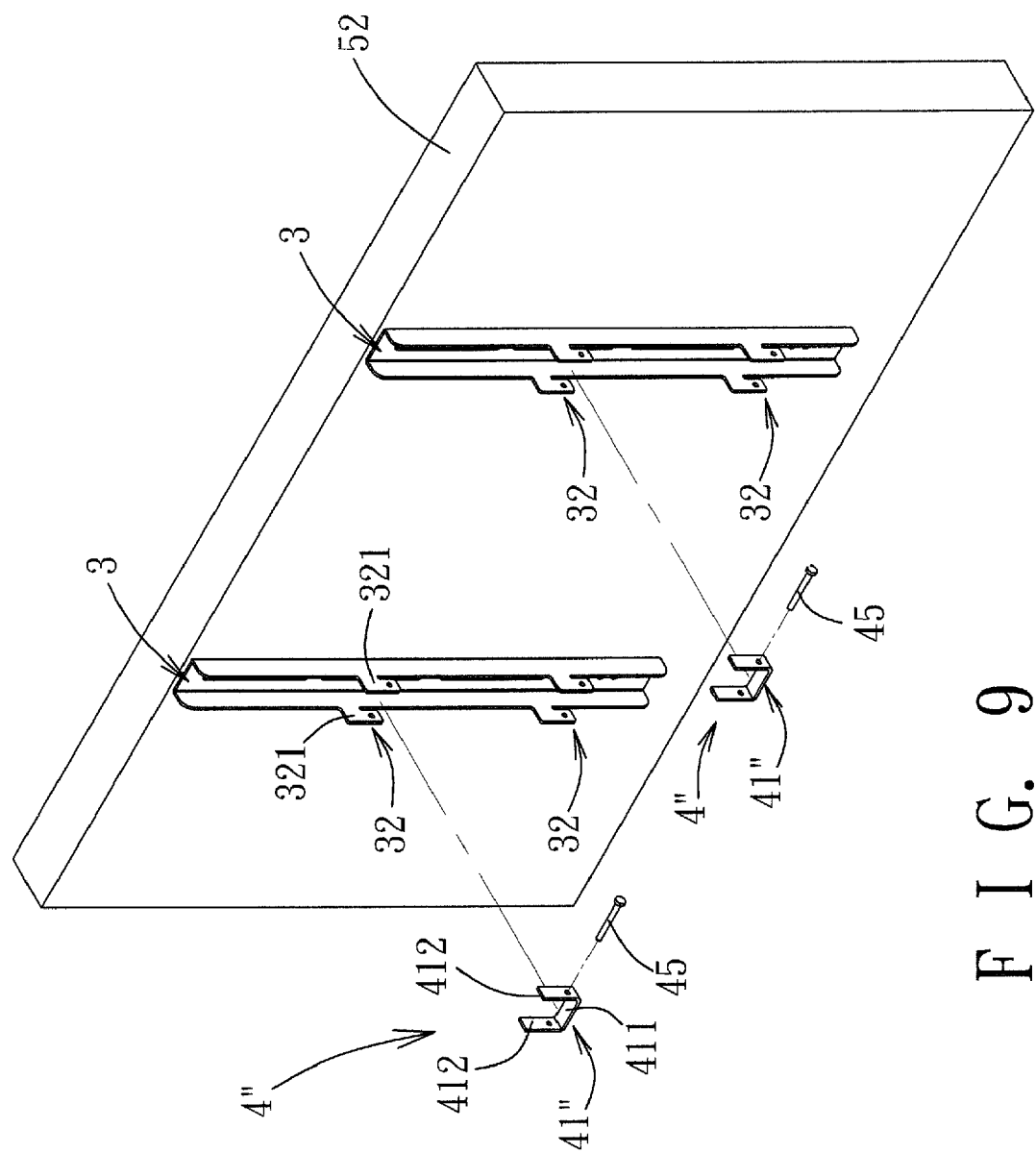
FIG. 9 is a fragmentary exploded perspective view of the third embodiment of a display suspending frame device according to the present invention, showing a fine-tuning unit and a second suspending frame.
Figure 10:
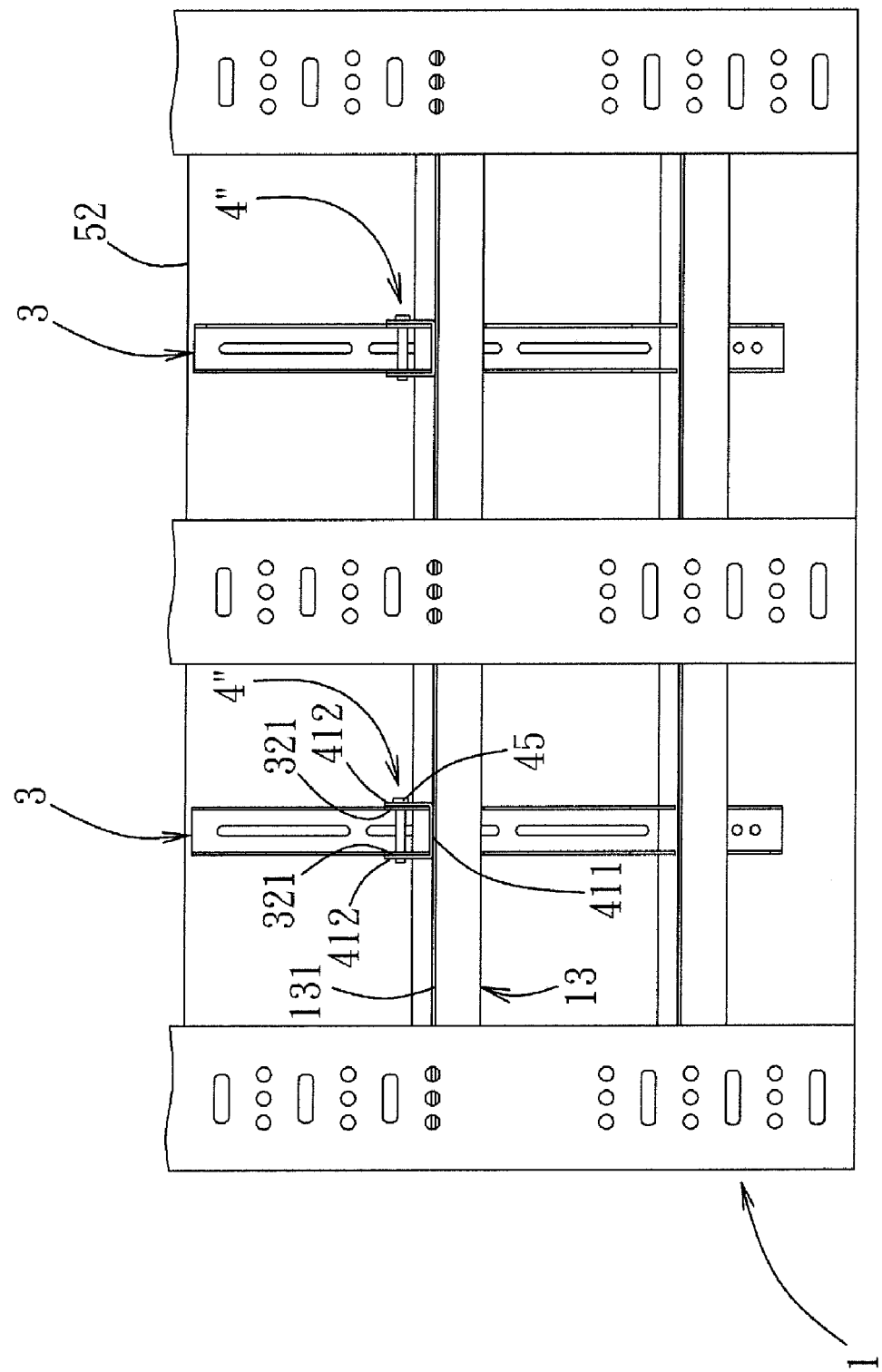
FIG. 10 is a fragmentary rear view of the third embodiment, showing a second display suspended on a securing frame.

FIGS. 9 and 10 show the third embodiment of the present invention, which differs from the first and second embodiments mainly in the structure of the fine-tuning units 4". Similarly, FIGS. 9 and 10 only illustrate the second suspending frames 3, the fine-tuning units 4" disposed respectively on the second suspending frames 3, and the second display 52.

In the third embodiment, each fine-tuning unit 4" includes a fine-tuning member 41" and a securing member 45. The fine-tuning member 41" is a pad and has a bottom portion 411 and two spaced-apart side portions 412 that extend upwardly from the bottom portion 411.

When it is desired to adjust the height of the second display 52, each fine-tuning member 41" is disposed such that the bottom portion 411 thereof is placed between the top plate 131 of the respective one of the second support portions 13 and the two hooks 321 of the respective one of the second suspending portions 32, with the two side portions 412 thereof respectively resting against the two hooks 321, and is secured in position by the securing member 45 (such as a pin) that extends through the two side portions 412 and the two hooks 321. Thus, the positions of the second suspending frames 3 can be raised by virtue of the thickness of the bottom portions 411 of the fine-tuning members 41" of the fine-tuning units 4", so that the second display 52 can be displaced upwardly to achieve the object of adjusting the height position of the second display 52.

In practice, fine-tuning members 41" with bottom portions 411 of different thicknesses can be fabricated so that fine-tuning members 41" with different thicknesses are available for use depending on the desired height position to which the second display 52 is to be adjusted. Thus, the object of fine-tuning the position of the second display 52 using the fine-tuning units 4" can be achieved.

Similarly, in the third embodiment, each of the two second suspending portions 32 of each of the second suspending frames 3 may be provided with a fine-tuning unit 4".

In the above-described three embodiments, the display suspending frame device of the present invention may include only one first suspending frame 2 and one second suspending frame 3 if the structural strength is sufficient. In other words, the first and second displays 51, 52 may be respectively suspended on the securing frame 1 by means of one first suspending frame 2 and one second suspending frame 3. In addition, each of the first and second suspending frames 2, 3 may include only one suspending portion 22, 32.

Additionally, in practice, the lower half portion of the securing frame 1 which includes the two second support portions 13 as shown in FIG. 3 may be used as a standalone securing frame structure, which may be used in conjunction with one or two second suspending frames 3 and a corresponding number of fine-tuning units 4 for suspending a single display, and which likewise can be used as a display suspending frame device with fine-tuning functionality.

Figure 11:
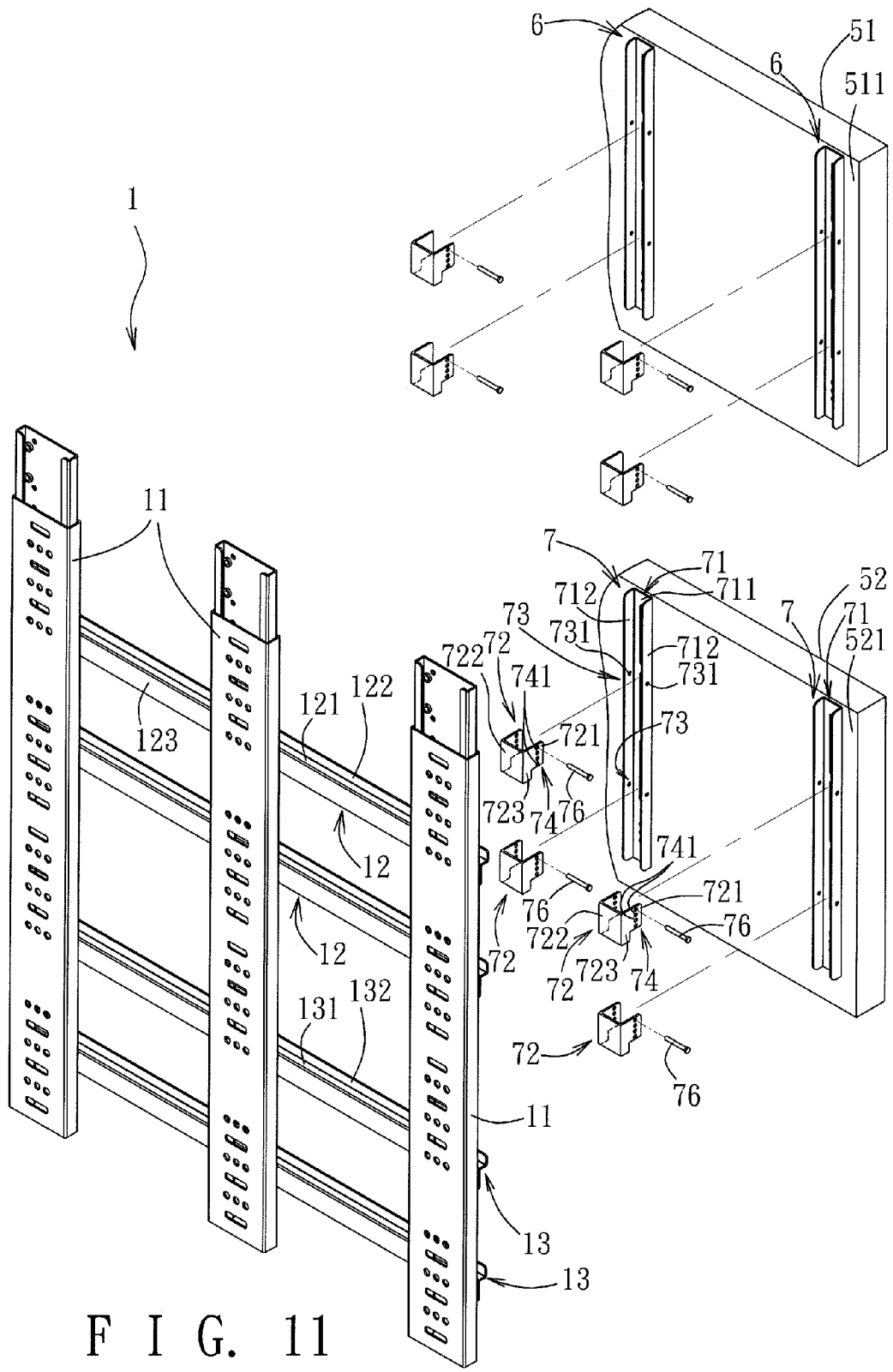
FIG. 11 is an exploded perspective view of the fourth embodiment of a display suspending frame device according to the present invention.
Figure 12:
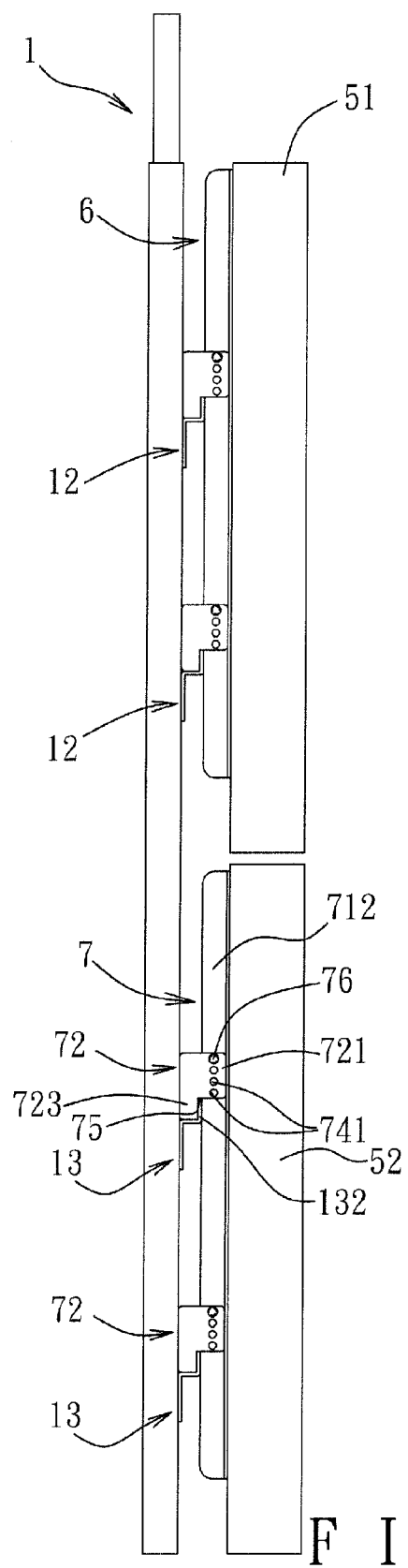
FIG. 12 is a side view of the fourth embodiment of the display suspending frame device with first and second displays suspended thereon, showing a clearance between the first and second displays.
Figure 13:
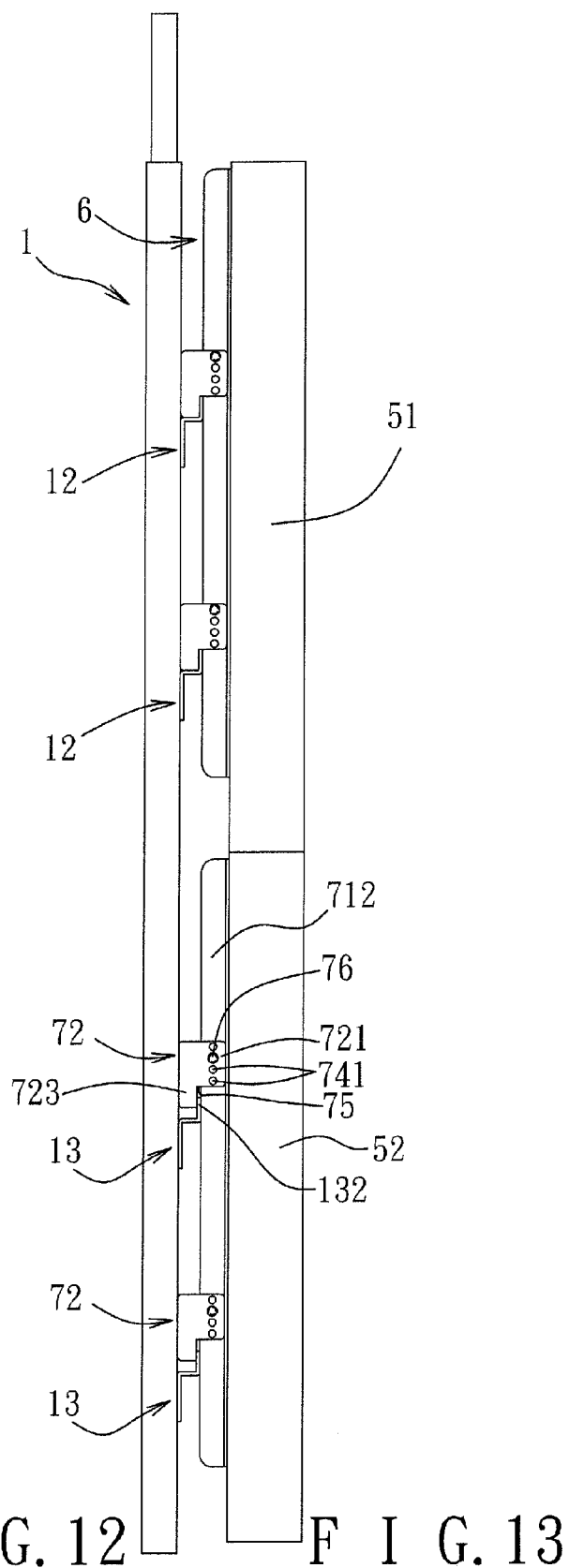
FIG. 13 is a side view similar to FIG. 12, but showing the second display abutting against a bottom side of the first display after adjustment.

Referring to FIGS. 11 to 13, the fourth embodiment of the present invention includes a securing frame 1, two first suspending frames 6, and two second suspending frames 7.

The structure of the securing frame 1 in this embodiment is identical to that shown in FIG. 1, and a description thereof will not be repeated herein. The two first suspending frames 6 are disposed to be mounted to the rear face 511 of the first display 51 for suspension of the first display 51 on the securing frame 1 by means of the two first suspending frames 6. The two second suspending frames 7 are disposed to be mounted to the rear face 521 of the second display 52 for suspension of the second display 52 on the securing frame 1 and below the first display 51 by means of the two second suspending frames 7.

In the fourth embodiment, since the two first suspending frames 6 and the two second suspending frames 7 are identical in structure, only the second suspending frames 7 are described in detail herein. Each of the second suspending frames 7 includes a suspending frame body 71, two suspending members 72 disposed on the suspending frame body 71, and two positioning bolts 76. Two first positioning portions 73 are disposed on each suspending frame body 71 and are spaced apart one above the other. Each of the suspending members 72 has a substantially inverted L-shaped structure, and is provided with a plurality of second positioning portions 74 that are spaced apart one above the other. Each of the two first positioning portions 73 of each suspending frame body 71 corresponds to the second positioning portions 74 of each of the suspending members 72. Each suspending frame body 71 is in the form of an upright elongated strip, and has a front plate 711 and two spaced-apart side plates 712 extending rearwardly from the front plate 711. Each of the first positioning portions 73 includes a pair of openings 731 disposed respectively in the two side plates 712 of the respective suspending frame body 71. The openings 731 of each of the first positioning portions 73 correspond in height.

Each of the suspending members 72 includes two spaced-apart side plates 721, and a connecting portion 722 interconnecting rear edges of the two side plates 721. Each of the side plates 721 projects downwardly at a point adjacent to the rear edge thereof to form a projection 723. Each of the second positioning portions 74 includes a pair of openings 741 that are disposed respectively in the two side plates 721 of the respective suspending member 72 adjacent to front edges of the side plates 721 and that correspond in height.

Each of the suspending members 72 is disposed such that the two side plates 721 thereof correspond respectively to the two side plates 712 of the respective suspending frame body 71, and such that the pair of openings 741 of one of the second positioning portions is aligned with the pair of openings 731 of the respective first positioning portion 73. By passing one of the positioning bolts 76 through the aligned openings 731, 741, each of the suspending members 72 can be positioned on the respective suspending frame body 71. When each of the suspending members 72 is disposed on the respective suspending frame body 71, the projection 723 of each of the side plates 721 thereof defines a gap 75 in cooperation with a rear edge of the respective side plate 712 of the respective suspending frame body 71.

When the second display 52 is suspended on the securing frame 1 by means of the second suspending frames 7, the two suspending members 72 of each of the second suspending frames 7 are respectively suspended on the second support portions 13 of the securing frame 1, and the first upright plate 132 of each of the second support portions 13 extends into the gaps 75 between the corresponding suspending members 72 and the side plates 712 of the corresponding suspending frame body 71.

By adjusting each of the suspending members 72 such that the pair of openings 741 at a different height is aligned with the corresponding pair of openings 731 in the respective suspending frame body 71, the height positions of the suspending members 72 disposed on the suspending frame bodies 71 can be adjusted to permit adjustment of the height at which the second display 52 is disposed on the securing frame 1. Thus, the second display 52 can be brought to abut against the bottom side of the first display 51 when suspended on the securing frame 1, thereby eliminating any clearance between the first and second displays 51, 52.

It is noted that, while the two first suspending frames 6 in the fourth embodiment may be identical to the second suspending frames 7 in structure, they may be configured to be identical in structure to the first suspending frames 2 of the first embodiment (see FIG. 2), in which the first suspending portions 22 are non-adjustably connected to the respective first suspending frame body 21.

In addition, the first positioning portions 73 and the second positioning portions 74 in this embodiment may be interchangeable in position, i.e., the first positioning portions 73 are disposed in the suspending members 72, whereas the second positioning portions 74 are disposed in the suspending frame bodies 71.

Similarly, the display suspending frame device of the present invention may, if the structural strength thereof is sufficient, include only one first suspending frame 6 and one second suspending frame 7, i.e., the first display 51 and the second display 52 are respectively suspended on the securing frame 1 by means of one first suspending frame 6 and one second suspending frame 7. In addition, each second suspending frame 7 may include only one suspending member 72.

In summary, whether as exemplified in the first to third embodiments in which the fine-tuning units 4, 4', 4'' are used to adjust the height of the second suspending frames 3 or as exemplified in the fourth embodiment in which the suspending members 72 can be mounted on the suspending frame bodies 71 at different heights, the present invention is simple in structure and easy to operate, and can achieve the object of adjusting the height position of a display 52 on the securing frame 1. Thus, in a situation where a plurality of displays 51, 52 are mounted one above the other, clearances between adjacent displays 51, 52 can be effectively eliminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display suspending frame device for suspending a first display and a second display one above the other, said display suspending frame device comprising:
a securing frame including a first support portion and a second support portion disposed below said first support portion;
a first suspending frame for mounting to a rear face of the first display to permit the first display to be suspended on said first support portion of said securing frame by means of said first suspending frame;
a second suspending frame including a second suspending frame body and a second suspending portion disposed on said second suspending frame body, said second suspending frame body being for mounting to a rear face of the second display, said second suspending portion being substantially inverted L-shaped and cooperating with said second suspending frame body to define a suspending groove that opens downwardly, said second support portion extending partially into said suspending groove when the second display is suspended on said second support portion by means of said second suspending portion and is disposed below the first display; and
a fine-tuning unit for adjusting height position of said second suspending portion relative to said second support portion, said fine-tuning unit being disposed between said second suspending portion and said second support portion and abutting against said second support portion when said fine-tuning unit moves said second suspending portion upwardly relative to said second support portion.

2. The display suspending frame device of claim 1, wherein said fine-tuning unit includes a screw bolt disposed on said second suspending portion and having a distal end oriented downwardly, said screw bolt being adjustable to displace downwardly and to abut against said second support portion so as to move said second suspending frame to displace upwardly relative to said securing frame.

3. The display suspending frame device of claim 2, wherein said fine-tuning unit further includes a locking plate disposed on said second suspending portion, said locking plate having a locking hole for threaded engagement with said screw bolt such that said distal end of said screw bolt is oriented downwardly.

4. The display suspending frame device of claim 3, wherein said second suspending portion includes two hooks connected to said second suspending frame body and disposed rearwardly of said second suspending frame body, said two hooks being spaced apart from each other, each of said hooks including a first extension segment extending rearwardly from said second suspending frame body, and a second extension segment extending downwardly from said first extension segment and spaced apart from said second suspending frame body, each of said hooks cooperating with said second suspending frame body to define a gap that opens downwardly, said suspending groove including said gaps which are respectively defined by said hooks with said second suspending frame body, said locking plate having a locking plate portion and two positioning plate portions extending downwardly from said locking plate portion and spaced apart from each other, said locking hole being disposed in said locking plate portion, said positioning plate portions being secured respectively to said hooks such that said locking plate portion is interposed between said hooks.

5. The display suspending frame device of claim 4, wherein said second support portion of said securing frame has a top plate and an upright plate extending upwardly from said top plate, said upright plate extending into said suspending groove when said second suspending portion is suspended on said second support portion, said fine-tuning member being adjustable to abut against said top plate.

6. The display suspending frame device of claim 5, wherein said second suspending frame body includes a front plate and two spaced-apart side plates extending rearwardly from said front plate, said second suspending frame body being mounted to the rear face of the second display by means of said front plate, said hooks being connected respectively to rear edges of said side plates.

7. A display suspending frame device comprising:
a suspending frame including a suspending frame body and a suspending portion disposed on said suspending frame body, said suspending portion being substantially inverted L-shaped and cooperating with said suspending frame body to define a suspending groove that opens downwardly, said suspending frame body being for mounting to a rear face of a display;
a securing frame including a support portion for suspending said suspending portion, said support portion extending partially into said suspending groove of said suspending frame when the display is suspended on said securing frame by means of said suspending frame; and
a fine-tuning unit for adjusting height position of said suspending portion relative to said support portion, said fine-tuning unit being disposed between said suspending portion and said support portion and abutting against said support portion when said fine-tuning unit moves said suspending portion upwardly relative to said support portion.

8. The display suspending frame device of claim 7, wherein said fine-tuning unit includes a screw bolt disposed on said suspending portion and having a distal end oriented downwardly, said screw bolt being adjustable to displace downwardly and to abut against said support portion so as to move said suspending frame to displace upwardly relative to said securing frame.

9. The display suspending frame device of claim 5, wherein said fine-tuning unit further includes a locking plate, said locking plate having a locking hole for threaded engagement with said screw bolt such that said distal end of said screw bolt is oriented downwardly.

10. The display suspending frame device of claim 6, wherein said suspending portion includes two hooks connected to said suspending frame body and disposed rearwardly of said suspending frame body, said two hooks being spaced apart from each other, each of said hooks including a first extension segment extending rearwardly from said suspending frame body, and a second extension segment extending downwardly from said first extension segment and spaced apart from said suspending frame body, each of said hooks cooperating with said suspending frame body to define a gap that opens downwardly, said suspending groove including said gaps which are respectively defined by said hooks with said suspending frame body, said locking plate having a locking plate portion and two positioning plate portions extending downwardly from said locking plate portion and spaced apart from each other, said locking hole being disposed in said locking plate portion, said positioning plate portions being secured respectively to said hooks such that said locking plate portion is interposed between said hooks.

11. The display suspending frame device of claim 10, wherein said support portion of said securing frame has a top plate and an upright plate extending upwardly from said top plate, said upright plate extending into said suspending groove when said suspending portion is suspended on said support portion, said fine-tuning member being adjustable to abut against said top plate.

12. The display suspending frame device of claim 11, wherein said suspending frame body includes a front plate and two spaced-apart side plates extending rearwardly from said front plate, said suspending frame body being mounted to the rear face of the display by means of said front plate, said hooks being connected respectively to rear edges of said side plates.

* * * * *